(12) United States Patent
Beaurepaire et al.

(10) Patent No.: US 12,165,415 B2
(45) Date of Patent: Dec. 10, 2024

(54) PROVIDING ACCESS TO AN AUTONOMOUS VEHICLE BASED ON USER'S DETECTED INTEREST

(71) Applicant: HERE Global B.V., Eindhoven (NL)

(72) Inventors: Jerome Beaurepaire, Berlin (DE);
Leon Stenneth, Chicago, IL (US);
Jeremy Michael Young, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 697 days.

(21) Appl. No.: 17/124,746

(22) Filed: Dec. 17, 2020

(65) Prior Publication Data

US 2022/0198196 A1    Jun. 23, 2022

(51) Int. Cl.

| | |
|---|---|
| *G06V 20/56* | (2022.01) |
| *B60Q 9/00* | (2006.01) |
| *B60R 25/01* | (2013.01) |
| *B60W 60/00* | (2020.01) |
| *G06F 16/29* | (2019.01) |
| *G06Q 10/02* | (2012.01) |
| *G06V 40/10* | (2022.01) |
| *G06V 40/16* | (2022.01) |
| *G06V 40/19* | (2022.01) |

(52) U.S. Cl.
CPC .............. *G06V 20/56* (2022.01); *B60Q 9/00* (2013.01); *B60R 25/01* (2013.01); *B60W 60/00253* (2020.02); *B60W 60/00272* (2020.02); *G06F 16/29* (2019.01); *G06Q 10/02* (2013.01); *G06V 40/103* (2022.01); *G06V 40/174* (2022.01); *G06V 40/19* (2022.01)

(58) Field of Classification Search
CPC ...... B60W 60/00253; B60W 60/00272; G06V 20/56; G06V 40/174; G06V 40/103; G06V 40/19
See application file for complete search history.

(56) References Cited

U.S. PATENT DOCUMENTS

| | | | |
|---|---|---|---|
| 6,947,881 B1 | 9/2005 | Murakami | |
| 9,803,391 B2 | 10/2017 | Banvait | |
| 9,972,150 B2 | 5/2018 | Da Deppo | |
| 2016/0364812 A1* | 12/2016 | Cao | .................. G06Q 50/01 |
| 2017/0153714 A1 | 6/2017 | Gao et al. | |
| 2018/0338229 A1 | 11/2018 | Nemec et al. | |
| 2019/0212738 A1 | 7/2019 | Umetani | |
| 2019/0265703 A1 | 8/2019 | Hicok | |
| 2019/0279487 A1* | 9/2019 | Hirose | .................. G06V 20/59 |
| 2020/0122802 A1* | 4/2020 | Bradlow | ................. B62M 6/60 |
| 2020/0160709 A1* | 5/2020 | Ramot | ........... B60W 60/00253 |

(Continued)

OTHER PUBLICATIONS

Extended European Search Report from European Patent Application No. 21214643.5, dated Aug. 5, 2022, 10 pages.

(Continued)

*Primary Examiner* — Margaret G Mastrodonato

(57) ABSTRACT

System and methods are provided that allow users of shared vehicles to benefit from an enhanced user experience that seamlessly unlocks and/or provides access to features for autonomous vehicles by proactively computing an interest index based on detected contextual behavioral patterns of the pedestrians such as the trajectory a candidate passenger is walking given a locational context.

17 Claims, 12 Drawing Sheets

(56) References Cited

U.S. PATENT DOCUMENTS

2020/0310433 A1 10/2020 Mukherjee
2022/0091240 A1* 3/2022 Haslim ................... G01S 7/499

OTHER PUBLICATIONS

Vasishta Pavan et al: "Natural vision based method for predicting pedestrian behaviour in urban environments", 2017 IEEE 20th International Conference On Intelligent Transportation Systems (ITSC), IEEE, Oct. 16, 2017 (Oct. 16, 2017), pp. 1-6.
Zhou, Yefang, et al. "A System of Shared Autonomous Vehicles Combined with Park-and-Ride in Residential Areas." Sustainability 2019, 11, 3113. Jun. 2, 2019. (pp. 1-15).

* cited by examiner

PROVIDING ACCESS TO AN AUTONOMOUS VEHICLE BASED ON USER'S DETECTED INTEREST

FIELD

The following disclosure relates to navigation devices or services.

BACKGROUND

Carmakers and other companies are developing autonomous vehicles that may drive themselves. Autonomous vehicles provide the promise of a reduced number of vehicles on the roadways through the adoption of shared fleets of autonomous vehicles. This frees up space for other uses, other travel modes, and creates more predictable travel times. One of the uses for autonomous vehicles is as an autonomous taxi service that allows customers to reserve the use of a shared vehicle for transportation.

Hailing or reserving a taxi or cab has typically included a series of human interactions including, for example, a wave, a shared glance, eye contact, a nod, etc. Some people may yell "Taxi!" at the top of their lungs while others whistle. Finding and hailing a tax or cab may also include multiple different gestures depending on the location and culture. However, this set of interactions may be eradicated by emerging technology. With app-based taxi services and ride sharing services, negotiations and choices may be accomplished through digital interactions within an application. App-based taxi services may include multiple different client applications that allow potential users to call for service, request a pick-up time, a pick-up location, and a drop-off location. The app-based taxi services may include mobile applications provided on mobile or portable devices. However, while convenient to many users, app-based taxi services may not be very inclusive, with certain segments of the population locked out, for example as some people do not own or operate smartphones and many do not believe it is safe to share personal data or details. Technological services such as app-based taxi services may thus be not very open and equal.

In addition, the use of autonomous vehicles for taxi services means that there is no longer a driver to interact with. One typical hailing method described above, for example, by lifting your arm up and out and trying to make eye contact with the cab driver is no longer available. In the context of an autonomous vehicle, there are no human eyes to make contact. It may still be possible to signal the taxi with a gesture such as sticking your arm out, but this may be awkward or futile when waving at empty vehicles and hoping that one responds. There exists a need to automatically and proactively activate features of an autonomous vehicle based on the detected interest of a nearby pedestrian without having to use an app-based taxi service or gesturing at each potential vehicle.

SUMMARY

In an embodiment, a method includes providing access to one or more features in a shared vehicle. The method includes monitoring, by a processor in the shared vehicle, an area around the shared vehicle; predicting, by the processor, trajectories for each pedestrian candidate in the area around the shared vehicle; calculating, by the processor in real time, an interest index value for each pedestrian candidate based on at least one trajectory for each pedestrian candidate; acknowledging, by the processor, an interest of a respective pedestrian candidate based on a respective interest index value passing a threshold value; and performing, by the processor, an action relating to access to the one or more features in the shared vehicle for the respective pedestrian candidate.

In an embodiment, an apparatus includes providing access to one or more features in a shared vehicle. The apparatus includes at least one processor and at least one memory including computer program code for one or more programs; the at least one memory configured to store the computer program code configured to, with the at least one processor, cause the at least one processor to: monitor an area around a shared vehicle; predict trajectories for each pedestrian candidate in the area around the shared vehicle; calculate an interest index value for each pedestrian candidate based on at least one predicted trajectory for each pedestrian candidate; acknowledge an interest of a pedestrian candidate based on a respective interest index value passing a threshold value; and generate a command to perform an action relating to access to one or more features in the shared vehicle for the pedestrian candidate.

In an embodiment, shared autonomous vehicle is providing including one or more sensors, a geographic database, a processor, and an automatic door locking mechanism. The one or more sensors are configured to acquire image data for one or more pedestrian candidates. The geographic database is configured to store mapping data. The processor is configured to predict destinations for the one or more pedestrian candidates based on the acquired image data and the mapping data. The processor is further configured to calculate an interest index value for each of the one or more pedestrians based on the predicted destinations. The automatic door locking mechanism is configured to unlock when the interest index value reaches a threshold value.

BRIEF DESCRIPTION OF THE DRAWINGS

Exemplary embodiments of the present invention are described herein with reference to the following drawings.

DETAILED DESCRIPTION

Figure 1:
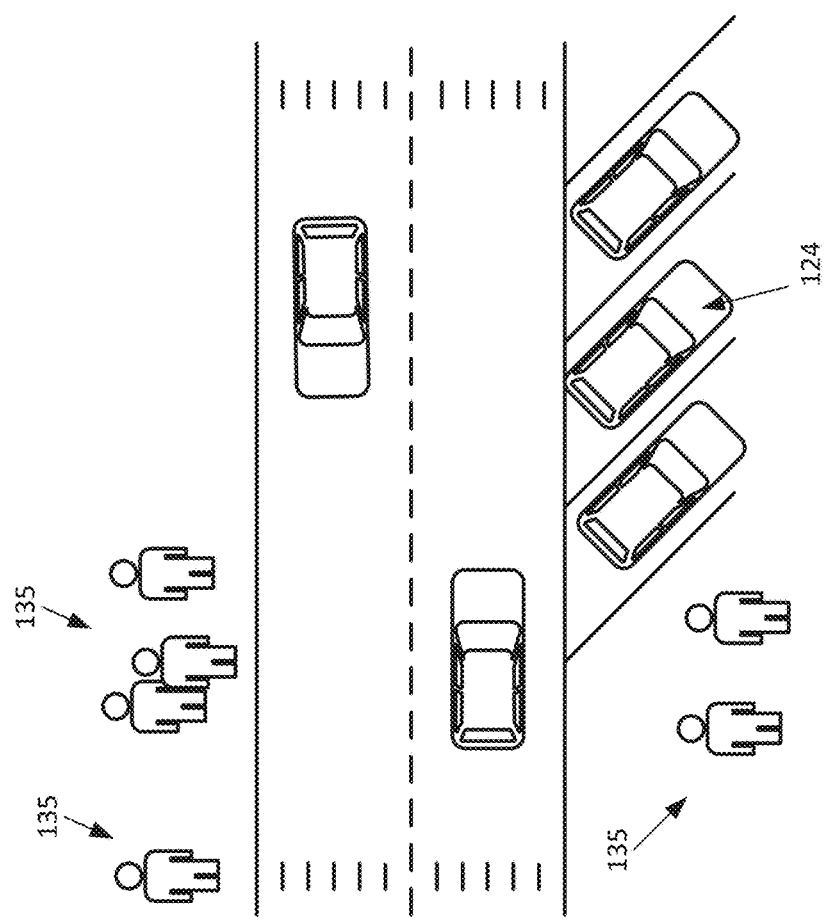
FIG. 1 depicts an example scenario for hailing a shared autonomous vehicle according to an embodiment.

Embodiments described herein provide systems and methods that allow users of shared vehicles to benefit from an enhanced user experience that seamlessly unlocks and/or provides access to features for autonomous vehicles by proactively computing an interest index based on detected contextual behavioral patterns of the pedestrians such as the trajectory a candidate passenger is walking given a locational context. The interest index reflects how interested a nearby pedestrian is in a specific shared vehicle based on detected contextual behavior patterns of pedestrians (for example, by using vision-based motion analysis, map data, contextual data etc.). The shared vehicle may provide access to different features based on the computed interest index for a nearby pedestrian. Feedback may also be provided by the shared vehicle to the pedestrian when a threshold of the interest index is reached, for example when the shared vehicle acknowledges the pedestrian's detected interest. Additionally, embodiments provide a spatial awareness for shared vehicles at their respective parking locations (for example based on map data, sensor data, dynamic information such as nearby events, number of people around etc.).

The systems and methods described herein may be applicable to vehicular systems in general, but more specifically to systems that support fully highly assisted, autonomous, or semi-autonomous vehicles. The term autonomous vehicle refers to a self-driving or driverless mode in which no passengers are required to be on board to operate the vehicle. There are five typical levels of autonomous driving. For level 1, individual vehicle controls are automated, such as electronic stability control or automatic braking. For level 2 at least two controls can be automated in unison, such as adaptive cruise control in combination with lane-keeping. For level 3, the driver can fully cede control of all safety-critical functions in certain conditions. The car senses when conditions require the driver to retake control and provides a "sufficiently comfortable transition time" for the driver to do so. For level 4, the vehicle performs all safety-critical functions for the entire trip, with the driver not expected to control the vehicle at any time. For level 5, the vehicle includes humans only as passengers, no human interaction is needed or possible. Vehicles classified under Levels 4 and 5 are considered highly and fully autonomous respectively as they can engage in all the driving tasks without human intervention. An autonomous vehicle may also be referred to as a robot vehicle or an automated vehicle. As defined, an autonomous vehicle may include passengers, but no driver is necessary. The autonomous vehicles may park themselves or move cargo or passengers between locations without a human operator. Autonomous vehicles may include multiple modes and transition between the modes.

One use of autonomous vehicles is for an autonomous taxi service or ride sharing service. Shared use of a vehicle may be referred to as shared mobility. Services such as vehicle sharing, bike sharing, scooter sharing, on demand ride services, and ride sharing may all be included in the category of shared mobility services. Shared mobility services provide cost savings, provide convenience, and reduce vehicle usage, vehicle ownership, and vehicle mile travelled. Different types of shared mobility may be provided. For example, based on booking time frame, shared mobility services typically include on-demand (the customers can reserve vehicles in real time), reservation-based (reserved in advance), and mixed systems. Current request scenarios for shared vehicle services are primarily on-demand, for example by entering a location into an application and requesting a vehicle at a current time. Both reservation-based and on-demand systems generally use mobile devices or smartphones to reserve a vehicle, typically sight unseen. A user sends their location and a request. A dispatcher receives the request and assigns a vehicle to the requester. However, there exist other types of use cases. For example, in one scenario, a customer may not possess or have access to a mobile device or shared mobility application. In another example, a shared vehicle may be not part of a fleet of vehicles, for example not part of or included in a shared mobility application. In both these examples, the vehicle must identify and provide access to the vehicle to a potential customer without using the reservation services of a shared mobility application.

FIG. 1 depicts an example scenario for an autonomous taxi service or ride sharing service. A shared vehicle 124 is parked in a parking spot waiting for a passenger to hail or reserve the shared vehicle 124. There are multiple candidate passengers 135 in the area, some of which may exhibit an interest in using the shared vehicle 124. In this example, the shared vehicle 124 may not provide access using an application. Alternatively, the shared vehicle 124 may provide access using both an application and also direct hailing or reserving by a passenger. The direct hailing or reserving without an application may be a challenge as the shared vehicle 124 only wants to provide access to passengers and not, for example, to remain unlocked and open at all times.

Figure 2:
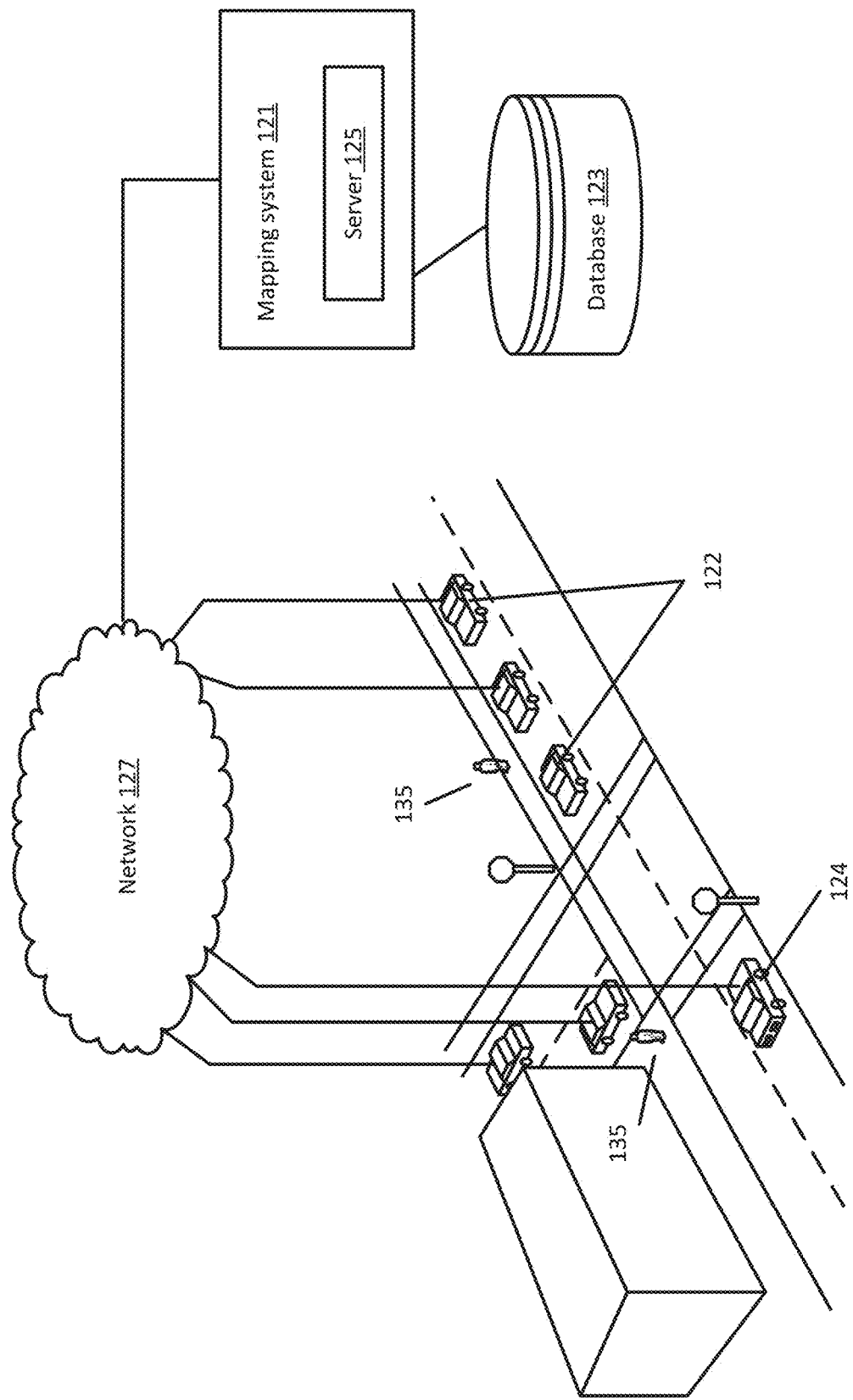
FIG. 2 depicts an example system for providing access to an autonomous vehicle based on user's detected interest according to an embodiment.

Embodiments provide an enhanced user experience including a seamless interaction with the vehicle that does not require a taxi-based application or ride sharing application. FIG. 2 illustrates an example system for computing an interest index based on detected contextual behavioral patterns of the pedestrians such as the trajectory a candidate passenger is walking given a locational context. The system includes at least a shared vehicle 124, one or more devices 122, a network 127, and a mapping system 121. FIG. 2 also includes one or more candidate passengers 135 (also may be referred to as potential users, potential passengers, or candidates) that may desire to use the shared vehicle 124. The mapping system 121 may include a database 123 (also referred to as a geographic database 123 or map database) and a server 125. Additional, different, or fewer components may be included.

The shared vehicle 124 may use a device 122 configured as a navigation system. An assisted or fully automated driving system may be incorporated into the device 122 and thus the shared vehicle 124. Alternatively, an automated driving device may be included in the vehicle. The automated driving device may include a memory, a processor, and systems to communicate with a device 122. The shared vehicle 124 may response to geographic data received from the geographic database 123 and the server 125. The shared vehicle 124 may take route instructions based on a road segment and node information provided to the navigation device 122. A shared vehicle 124 may be configured to receive routing instructions from a mapping system 121 and automatically perform an action in furtherance of the instructions. The shared vehicle's ability to understand its precise positioning, plan beyond sensor visibility, possess contextual awareness of the environment, and local knowledge of the road rules are critical.

The shared vehicle 124 may include a variety of devices or sensors that collect position data as well as other related sensor data for the surroundings of the shared vehicle 124. The position data may be generated by a global positioning system, a dead reckoning-type system, cellular location system, or combinations of these or other systems, that may be referred to as position circuitry or a position detector. The positioning circuitry may include suitable sensing devices that measure the traveling distance, speed, direction, and so on, of the shared vehicle 124. The positioning system may also include a receiver and correlation chip to obtain a GPS or GNSS signal. Alternatively, or additionally, the one or more detectors or sensors may include an accelerometer built or embedded into or within the interior of the shared vehicle 124.

The shared vehicle 124 may include one or more distance data detection devices or sensors, such as a LiDAR or RADAR device. The distance data detection sensor may include a laser range finder that rotates a mirror directing a laser to the surroundings or vicinity of the collection vehicle on a roadway or another collection device on any type of pathway. A connected vehicle includes a communication device and an environment sensor array for detecting and reporting the surroundings of the shared vehicle 124 to the mapping system 121. The connected vehicle may include an integrated communication device coupled with an in-dash navigation system. The connected vehicle may include an ad-hoc communication device such as a mobile device or smartphone in communication with a vehicle system. The communication device connects the vehicle to a network including at least the mapping system. The network may be the Internet or connected to the internet.

The shared vehicle 124 may rely on sensors to keep the vehicle in the correct lane, perform maneuvers, and/or avoid obstacles. The device 122 may be configured to provide lane level positioning of the shared vehicle 124. Lane level positioning may be provided using one or more sensor systems embedded in the vehicle or related thereto. Lane level positioning, for example, may be provided using a series of GPS points acquired by the device 122. In an embodiment, the location of the shared vehicle 124 is map matched to a lane using the sensor data. The shared vehicle's 124 location within the lane may also be determined. A GPS value may be used to identify the road segment using a map matching algorithm to match the GPS coordinates to a stored map and road segment. Lane level map matching may provide a good estimate of what lane a vehicle is on given a sequence of GPS probes coming from the vehicle. Other sensor data may be used to identify the lane, position in the lane, and road segment that the vehicle is operating on. The device 122 may use data from lateral acceleration sensors. Lane changes and positioning may be detected by determining a threshold of acceleration time, above which a lane change would have occurred. The device 122 may only detect that the change was of sufficient magnitude and direction to have a displacement greater than the lane width. The device 122 may use inertial measurement units (IMU), gyro compasses, gyro-like compasses, or magnetometers of sufficient sensitivity to indicate if the vehicle is or is not turning onto another road. For example, a value would be less than a 45-degree total change without a road curvature. The device 122 may use a lateral acceleration method indicating initiation of a lane change, followed by lateral deceleration without a large change in direction to indicate completion of the lateral displacement. A determination of intent or completion of a lane change may be determined by the device 122 using individual techniques or a combination of multiple techniques. The device 122 may acquire data from multiple sensors from which intent or completion of lane maneuvers may be derived. Precise positioning may be provided using LiDAR, RADAR, video, images, or other sensors on the shared vehicle 124. For example, the device 122 may determine a current position or location based on image recognition techniques and a stored high-definition map. The device 122 may use LiDAR and RADAR to recognize information from the environment, such as curbs, road shapes, rails, vehicles, and road infrastructures. As an example, LiDAR components emit and receive laser signals to directly measure the distance and intensity from the sensor to the objects. The LiDAR sensor may be configured to provide a 3D representation of the surrounding environment up to a distance of several hundred meters via installation of the sensor on top of the vehicle. For positioning data, the device 122 may identify lane markings from a difference in the intensity between the asphalt and the ink painting from the ground data.

The device 122 may also use passive sensors, such as vision-based techniques with cameras or other imaging sensors. The device 122 may use a vision-based technique to calculate an odometry from feature points of an acquired image and positioning in real-time. The device 122 identifies lane markings and GPS and inertial measurement units (IMU) provide the positioning. The device 122 may also use a map-matching method provided by a precise high-definition (HD) map. An HD map, stored in or with the geographic database 123 or in the devices 122 is used to allow a device 122 to identify precisely where it is with respect to the road (or the world) far beyond what the Global Positioning System (GPS) can do, and without inherent GPS errors. The HD map allows the device 122 to plan precisely where the device 122 may go, and to accurately execute the plan because the device 122 is following the map. The HD map provides positioning and data with decimeter or even centimeter precision.

The one or more devices 122 may also include probe devices, probe sensors, IoT (internet of things) devices, or other devices 122 such as personal navigation devices 122 or connected vehicles. The devices 122 may be a mobile device or a tracking device that provides samples of data for the location of a person or vehicle. The devices 122 may include mobile phones running specialized applications that collect location data as the devices 122 are carried by persons or things traveling a roadway system. The one or more devices 122 may include traditionally dumb or non-networked physical devices and everyday objects that have been embedded with one or more sensors or data collection applications and are configured to communicate over a network 127 such as the internet. The devices may be configured as data sources that are configured to acquire roadway data. These devices 122 may be remotely monitored and controlled. The devices 122 may be part of an environment in which each device 122 communicates with other related devices in the environment to automate tasks. The devices may communicate sensor data to users, businesses, and, for example, the mapping system 121.

A high-definition map and the geographic database 123 are maintained and updated by the mapping system 121. The mapping system 121 may include multiple servers, workstations, databases, and other machines connected together and maintained by a map developer. The mapping system 121 may be configured to acquire and process data relating to roadway or vehicle conditions. For example, the mapping system 121 may receive and input data such as vehicle data, user data, weather data, road condition data, road works data, traffic feeds, etc. The data may be historical, real-time, or predictive.

The server 125 may be a host for a website or web service such as a mapping service and/or a navigation service. The mapping service may provide standard maps or HD maps generated from the geographic data of the database 123, and the navigation service may generate routing or other directions from the geographic data of the database 123. The mapping service may also provide information generated from attribute data included in the database 123. The server

125 may also provide historical, future, recent or current traffic conditions for the links, segments, paths, or routes using historical, recent, or real time collected data. The server 125 is configured to communicate with the devices 122 through the network 127. The server 125 is configured to receive a request from a device 122 for a route or maneuver instructions and generate one or more potential routes or instructions using data stored in the geographic database 123.

To communicate with the devices 122, the shared vehicle 124, systems or services, the server 125 is connected to the network 127. The server 125 may receive or transmit data through the network 127. The server 125 may also transmit paths, routes, or risk data through the network 127. The server 125 may also be connected to an OEM cloud that may be used to provide mapping services to vehicles via the OEM cloud or directly by the mapping system 121 through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMAX (Worldwide Interoperability for Microwave Access) network, DSRC (otherwise known as WAVE, ITS-G5, or 802.11p and future generations thereof), a 5G wireless network, or wireless short-range network such as Zigbee, Bluetooth Low Energy, Z-Wave, RFID and NFC. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols. The devices 122 and shared vehicles 124 may use Vehicle-to-vehicle (V2V) communication to wirelessly exchange information about their speed, location, heading, and roadway conditions with other vehicles, devices 122, or the mapping system 121. The devices 122 may use V2V communication to broadcast and receive omni-directional messages creating a 360-degree "awareness" of other vehicles in proximity of the vehicle. Vehicles equipped with appropriate software may use the messages from surrounding vehicles to determine potential threats or obstacles as the threats develop. The devices 122 may use a V2V communication system such as a Vehicular ad-hoc Network (VANET).

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway. Remote sensing, such as aerial or satellite photography, may be used. The database 123 is connected to the server 125. The geographic database 123 and the data stored within the geographic database 123 may be licensed or delivered on-demand. Other navigational services or traffic server providers may access the traffic data stored in the geographic database 123. Data for an object or point of interest may be broadcast as a service.

The geographic database 123 is a key component for calculating the trajectories and interest index values as described below as the geographic database 123 provides the core knowledge about the area around the shared vehicle 124, for example the streets/roads/paths (dead ends, one-way streets, etc.), points of interest (POI), business hours, business types, business popularity, relevant public transport stations, public spaces such as parks, lakes, motorways, tracks etc. The mapping features are used to compute the interest index as a goal of the index is to determine the likelihood that a given user is interested in boarding a specific vehicle. The use of the map data allows a shared vehicle 124 to predict with high accuracy a trajectory and destination of a given user/candidate. When the trajectory of the candidate is predicted to end at the shared vehicle 124 (or with a high probability) the shared vehicle 124 provides access to one or more features to the candidate. The result is a seamless integration of shared vehicles 124. An individual who was used to owning a vehicle may be able to operate and use shared vehicles 124 as if the shared vehicles 124 were their own. A user with their own vehicle may be accustomed to walking up to their vehicle, entering, and operating the vehicle. No mobile application needed, no hailing gestures, or intricate dance needed to hail or reserve a personal vehicle. With a shared vehicle 124, the user may have the same experience. They may be able to walk up to a shared vehicle 124 that is configured to identify that the user is a passenger, reserve the shared vehicle 124, and access one or more features such as unlocking or opening a door. With this system, similar to a personal vehicle, no mobile application is needed, no hailing gestures or intricate dances are required needed to hail or reserve the shared vehicle 124.

Figure 3:
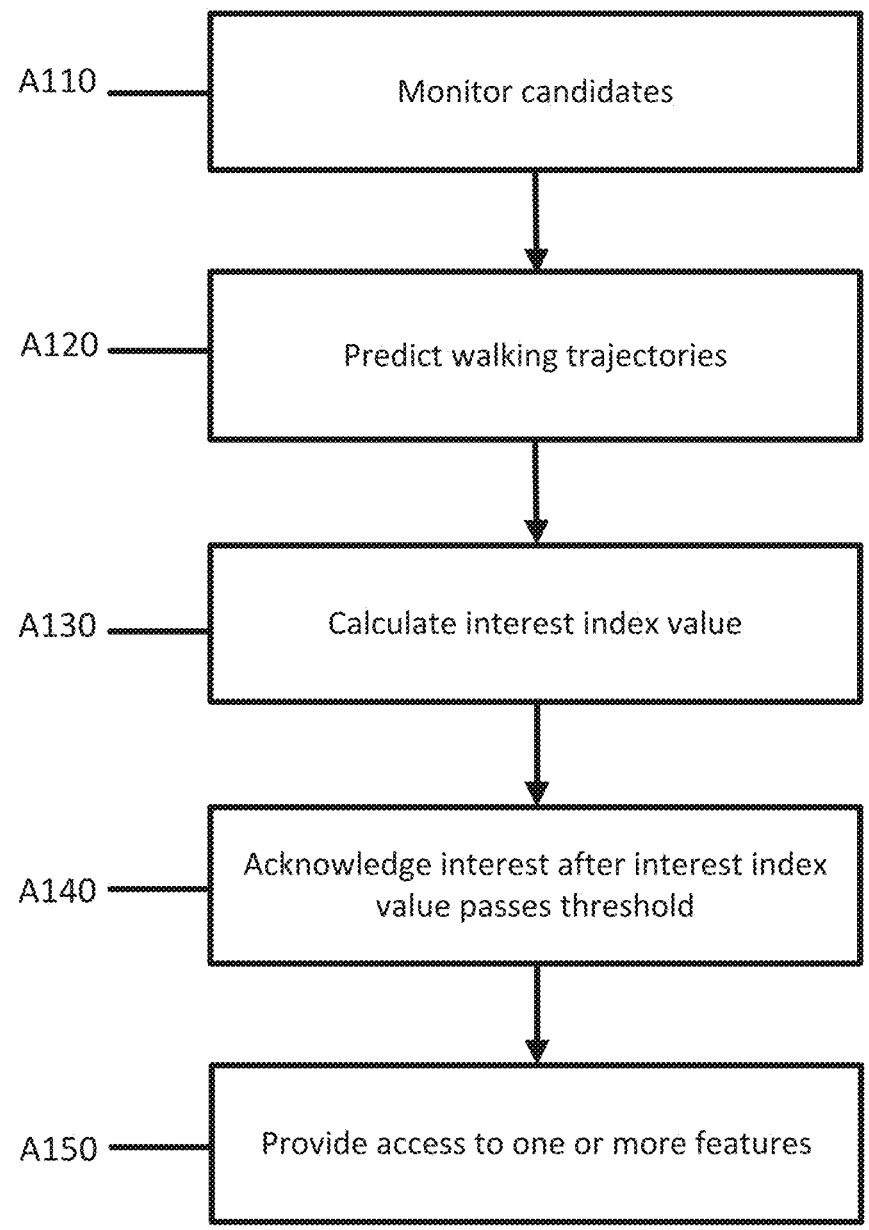
FIG. 3 depicts an example workflow for providing access to an autonomous vehicle based on user's detected interest according to an embodiment.

FIG. 3 depicts a workflow for computing an interest index based on detected contextual behavior patterns of candidate pedestrians. As presented in the following sections, the acts may be performed using any combination of the components indicated in FIG. 2, FIG. 11, or FIG. 12. The following acts may be performed by the shared vehicle 124, server 125, the device 122, the mapping system 121, or a combination thereof. As an example, a copy of the geographic database 123 may be updated on both the device 122, shared vehicle 124, or in the mapping system 121. A shared vehicle 124 may take instruction from either the device 122 or the mapping system 121 based on data stored in the geographic database 123. In certain situations, the device 122 may be used as there is little to no delay for instructions to be generated and transmitted from the device 122 to the shared vehicle 124. The server 125 of the mapping system 121 may collect data from multiple devices 122 and provide this data to each of the devices 122 and shared vehicles 124 so that the devices and shared vehicles 124 are able to provide accurate instructions. Additional, different, or fewer acts may be provided. The acts are performed in the order shown or other orders. The acts may also be repeated. Certain acts may be skipped.

At Act A110 the shared vehicle 124 monitors an area around the shared vehicle 124. The shared vehicle 124 may be stationary or in motion. A stationary vehicle, for example, may park itself in a parking spot and wait for a passenger. A vehicle in motion may drive around an area looking for potential customers. As will be described below, a shared vehicle 124 may use spatial awareness to identify a location that is promising. The shared vehicle 124 may then park in such an area while continuing to monitor for potential passengers.

Figure 4:
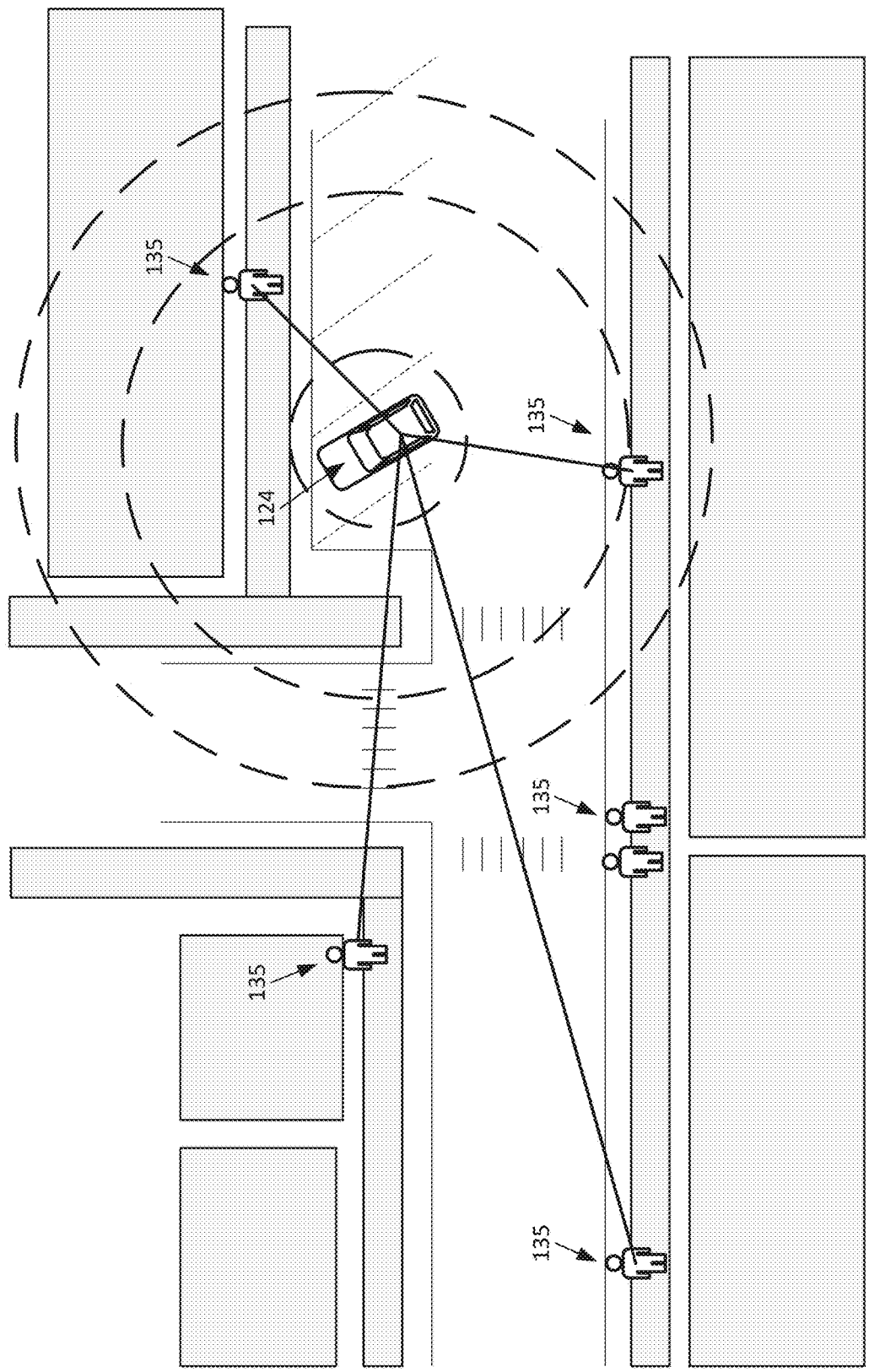
FIG. 4 depicts an example of a shared vehicle monitoring an area according to an embodiment.

FIG. 4 depicts an example shared vehicle 124 parked in a parking spot. In FIG. 4 there are six potential users 135 of the shared vehicle 124. The shared vehicle 124 may monitor each of these candidates 135 while their interest index remains above a certain level or until a potential user moves out of range. As an example, if the pedestrian to the left of the shared vehicle 124 is moving to the left (e.g., away from the shared vehicle 124), then there is close to a zero probability that the user will become a passenger of the shared vehicle 124 and thus may not need to be monitored.

In an embodiment, monitoring includes capturing data related to the one or more candidate users. Monitoring may include identifying candidates 135 by acquiring image or other data about the location of the candidates 135 over a period of time while the one or more candidates 135 are within range of the shared vehicle 124. The shared vehicle 124 may make use of any data available to the shared vehicle 124. The shared vehicle 124 may monitor potential users using sensors embedded with the shared vehicle 124 such as cameras, Radar, and LiDAR.

The shared vehicle 124 may use video cameras and sensors in order to see and interpret objects and potential users. The shared vehicle 124, may for example, be equipped with cameras at every angle and may be capable of maintaining a 360° view of its external environment. The shared vehicle 124 may utilize 3D cameras for displaying highly detailed and realistic images. The sensors automatically detect objects, classify the objects, and determine the distances between the objects and the vehicle. For example, the cameras may identify other cars, pedestrians, cyclists, traffic signs and signals, road markings, bridges, and guardrails. By identifying potential users over time, the shared vehicle 124 may be able to track and predict movements by each potential user.

The shared vehicle 124 may also use a radar device. Radar sends out radio waves that detect objects and gauge their distance and speed in relation to the vehicle in real time. Both short- and long-range radar sensors may be deployed all around the car and each one has their different functions. While short range (24 GHz) radar applications enable blind spot monitoring, for example lane-keeping assistance, and parking aids, the roles of the long range (77 GHz) radar sensors include automatic distance control and brake assistance. Unlike camera sensors, radar systems typically have no trouble when identifying objects during fog or rain. The shared vehicle 124 may also be equipped with LiDAR. LiDAR sensors work similar to radar systems, with the difference being that LiDAR uses lasers instead of radio waves. Apart from measuring the distances to various objects on the road, the shared vehicle 124 may use LiDAR to create 3D images of the detected objects and mapping the surroundings. The shared vehicle 124 may use LiDAR to create a full 360-degree map around the vehicle rather than relying on a narrow field of view.

The shared vehicle 124 may use multiple different sensors to monitor potential candidates 135. Different sensors may be used at different times of the day (because of lighting) or in different locations or during weather events. In additional to on-board sensors, the shared vehicle 124 may also acquire data from other devices or sensors in the area, for example, security cameras or other imaging sensors. The shared vehicle 124 may use data from other sources such as other vehicles or the mapping system 121. The shared vehicle 124, in certain scenarios, may be able to connect or detect devices 122 that are carried with or embedded in candidates 135. Different devices 122 may emit radio waves or other detectable transmissions that can pinpoint or identify the location of the devices 122. The shared vehicle 124 may use this data to monitor and track candidates 135 around the shared vehicle 124. The shared vehicle 124 may also be able to identify specific candidates 135, for example, by using facial recognition or other methods.

At Act A120, the shared vehicle 124 predicts walking trajectories/paths for each candidate 135 in the area around the shared vehicle 124. A predicted walking trajectory or path may be based on detected motion of a candidate 135 along with location context of the area the candidate 135 is traversing. In an embodiment, the shared vehicle 124 predicts a destination for the candidate 135 (e.g., whether the candidate 135 will end up at the shared vehicle 124 or another location). The shared vehicle 124 may predict multiple different paths for each candidate 135 and assign each a probability based on the detected motion and the location context. As an example, the shared vehicle 124 may identify a candidate 135 and monitor the candidate 135 as the candidate 135 traverses the area around the shared vehicle 124. At set time points, for example, every second, every other second, every five second, etc., the shared vehicle 124 predicts different possible outcomes, for example end points or destinations for different trajectories, and assigns each a probability. As an example, if the candidate 135 is following the flow of pedestrian traffic and does not detour, the shared vehicle 124 may predict that the candidate 135 will continue on their way in the flow of traffic and pass by the shared vehicle 124 and then out of the area. In another example, if the candidate 135 stops or makes a distinguishable alteration in their path, the shared vehicle 124 may predict that the candidate 135 will take another path, for example that ends up at a respective point or interest or the shared vehicle 124. Additional information, such as weather conditions or events (parades, sporting events, concerts etc.), construction, etc. may also be used to calculate a trajectory/path or destination for a candidate 135.

Figure 5:
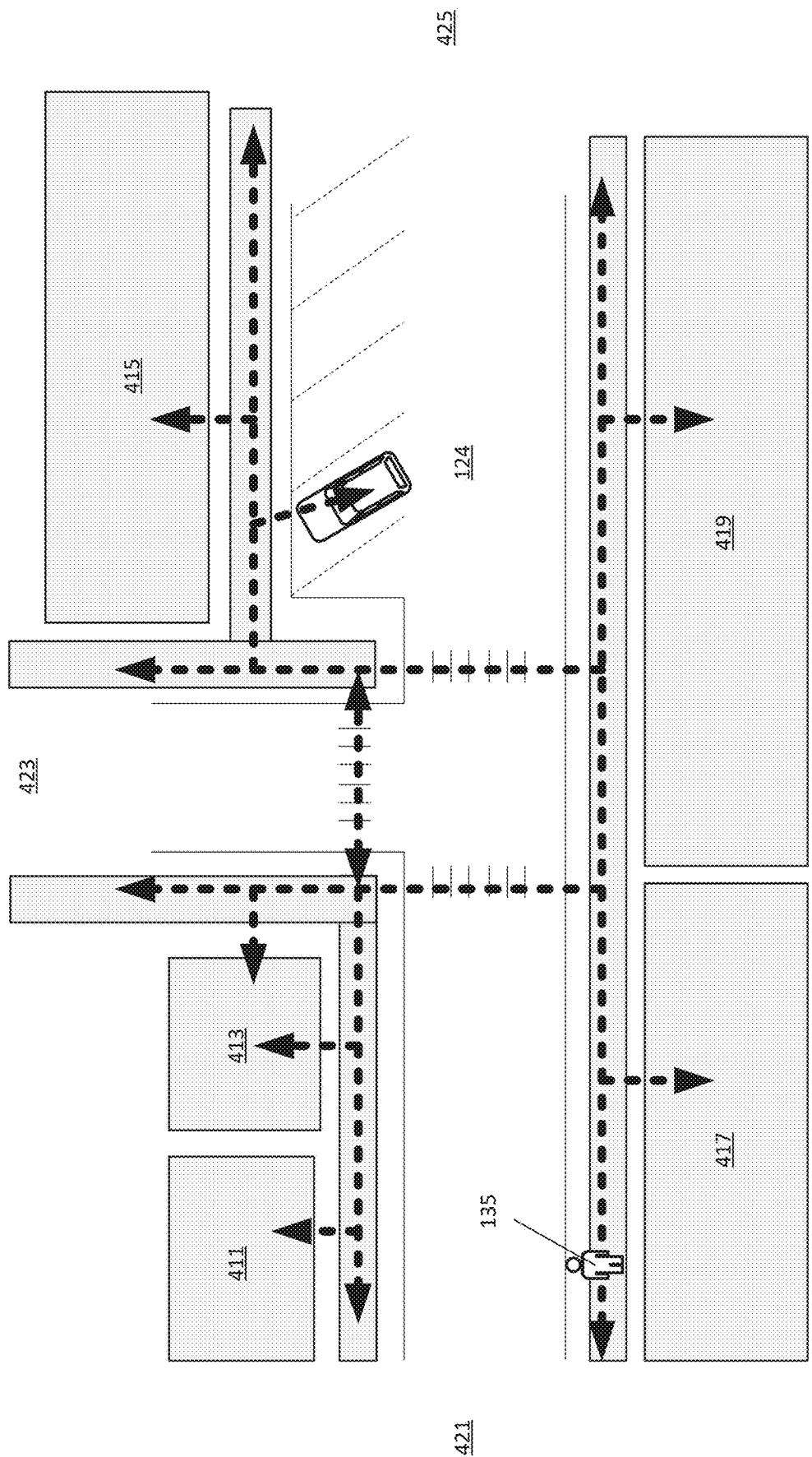
FIG. 5 depicts an example of possible pedestrian paths for a candidate pedestrian according to an embodiment.

FIG. 5 depicts a map of the same area as FIG. 4. FIG. 5 includes nine (9) possible destinations 411, 413, 415, 417, 419, 421, 423, 425, including the shared vehicle 124. A candidate 135 may take various paths (depicted as dotted lines) from their current location to any of the destinations. The shared vehicle 124 is configured to assign a probability to each of the paths/destinations based on motion analysis and locational context. Different destinations may be more or less likely based on their status or type. Different paths may be more or less likely based on the motion of the user. As the candidate 135 traverses the area, different paths and destinations may be become more or less likely based on the current location and trajectory of the candidate 135. The probability of each path/destination is used to calculate the interest index value for the candidate 135.

The shared vehicle 124 may use vision-based motion analysis to extract information from sequential images in order to detect the motion or path of each candidate 135. Motion analysis requires the estimation of the position and orientation (pose) of an object across image sequences. Through the identification of common object features in successive images, displacement data may be tracked over time. The shared vehicle 124 may use a depth map to track candidate pedestrians. The depth map is an image where each pixel, instead of describing color or brightness, describes the distance of a point in space from the camera. The shared vehicle 124 may use depth-sensing camera systems or other sensors such as passive stereo camera systems to active cameras that sense depth through the projection of light into the observed scene. Active, depth-sensing camera systems may also be used. The devices most commonly use one of two technologies: structured light or time-of-flight. Structured light devices sense depth through the deformations of a known pattern projected onto the scene, while time-of-flight devices measure the time for a pulse of light to return to the camera.

Tracking candidates 135 includes identifying a human/pedestrian and then tracking their motions. Identifying a candidate 135 in an image or images may include using a machine learning based classifier that is trained to identify humans in an image. The machine learning based classifier may include a trainable algorithm or may be for example a deep, multilayer, artificial neural network, a Support Vector Machine (SVM), a decision tree, or other type of network. The artificial neural network or trainable algorithm may be based on k-means clustering, Temporal Difference (TD) learning, Q learning, a genetic algorithm, and/or association rules or an association analysis. The artificial neural network may for example be or include a (deep) convolutional neural network (CNN), a (deep) adversarial neural network, a (deep) generative adversarial neural network (GAN), or other type of network. The artificial neural network may be trained to input an image and output one or more classifications of objects, for example candidates 135, in the image.

Once a candidate 135 has been detected, the motion of the candidate 135 may then be determined by taking a difference between two-pixel values in consecutive frames. A kinematic approach may be used by detecting motion trajectory by 2-D trajectory points (X, Y, T) or 3-D trajectory points (X, Y, Z, T). In an embodiment, each point corresponds to respective joint value in frame for human posture. The motion is detected by identifying motion using optical flow or using a motion history image or a binary motion energy image. A binary motion energy image is initially computed to act as an index into the action library. The binary motion energy image coarsely describes the spatial distribution of motion energy for a given view of a given action. Any stored binary motion energy images that plausibly match the unknown input binary motion energy image are then tested for a coarse motion history agreement with a known motion model of the action. A motion history image is the basis of that representation. The motion history image is a static image template where pixel intensity is a function of the recency of motion in a sequence.

The pedestrian motion may be either directly detected from image sequences or detected in a multiple layer process. For simple actions, motion is recognized directly from image sequences. However, complicated activities may be recognized by using multiple layer recognition methods. Depending on complexity, human motion may be conceptually categorized into gestures, actions, activity, interactions, and group activities. Complicated motion may be recognized using multiple layers, for example by decomposing the motion into simple actions or gestures. Recognized simple actions or gestures at lower levels are used for the recognition of complicated motions at higher levels. The recognition methods for simple actions are categorized into space time volume, space time trajectories, space time local features, pattern-based approaches, and state space-based approaches. For complicated activities and interactions, multi-layer recognition methods may be used such as statistical approaches, syntactic approaches, and descriptive approaches.

The input to the shared vehicle 124 is the sensor data. The output is an identification of one or more pedestrians and any detected motion of the candidates 135. The detected motion may at least include the walking direction of which the candidate 135 is facing in order to predict where the candidate 135 may move in future. Depending on the sensor input, distance, and conditions, the detected motion may just be the walking direction. If the sensor input is of a high level, the detected motion may include detected gesture data such as facial expressions or a determination that the pedestrian is carrying an article such as a bag. The detected motion is used to compute the walking trajectory and estimated destination of the one or more candidates 135. In an embodiment, the shared vehicle 124 only tracks a subset of candidates 135, for example, those within a certain area or those with interest index values above a certain level. As an example, for a particular candidate 135, once the shared vehicle 124 has all but ruled out the candidate 135 as a potential user, the shared vehicle 124 may no longer track the candidate 135 or for example, may limit the monitoring to a minimum.

In order to predict walking trajectories/paths and estimated destinations, map data from the geographic database 123 is key as it provides the core knowledge about the surroundings, e.g., the location context. The map data along with the detected walking trajectories up to a point in time provide the shared vehicle 124 with a basis for predicting a destination of the candidate 135. The geographic database 123 includes information about the configuration of the roadways, points of interest, traffic flow, etc. The shared vehicle 124 may use the geographic database 123 to identify possible destinations for pedestrians in different locations, at different times, during events, in different weather, etc. If, for example, there are few points of interest, e.g., destinations, for a candidate user that crosses a roadway and approaches the shared vehicle 124, the shared vehicle 124 makes more sense as a destination as opposed to if there were lots of points of interests and therefore lots of potential destinations that the candidate 135 could be headed for. The location context may thus be able to assist is narrowing, eliminating, or boosting probabilities for certain destinations.

Figure 6:
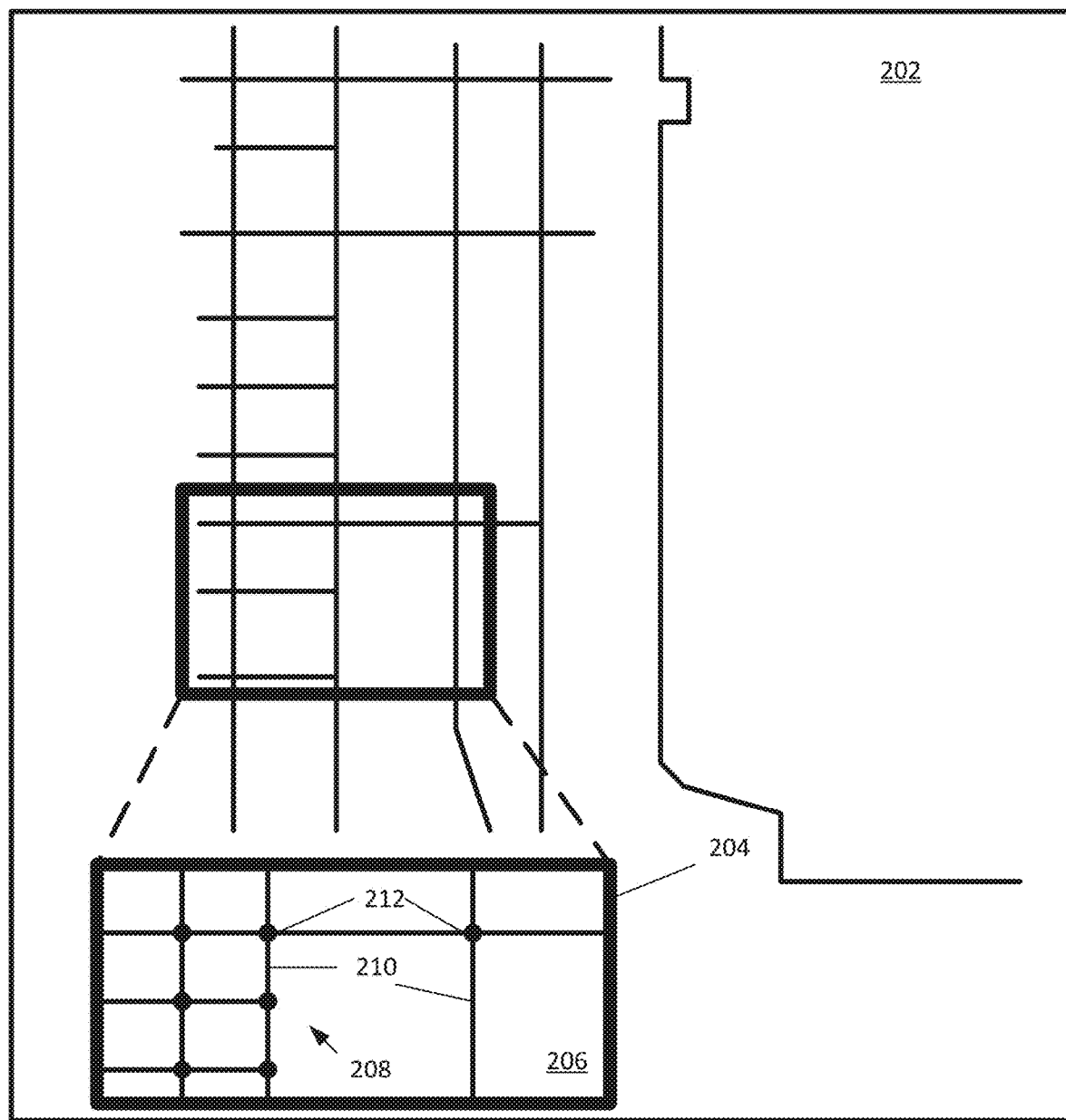
FIG. 6 depicts an example region of a geographic database.

Information about the roadway, possible paths, and potential destination is stored in a geographic database 123. The geographic database 123 includes information about one or more geographic regions. FIG. 6 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 6 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it one or more nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 7:
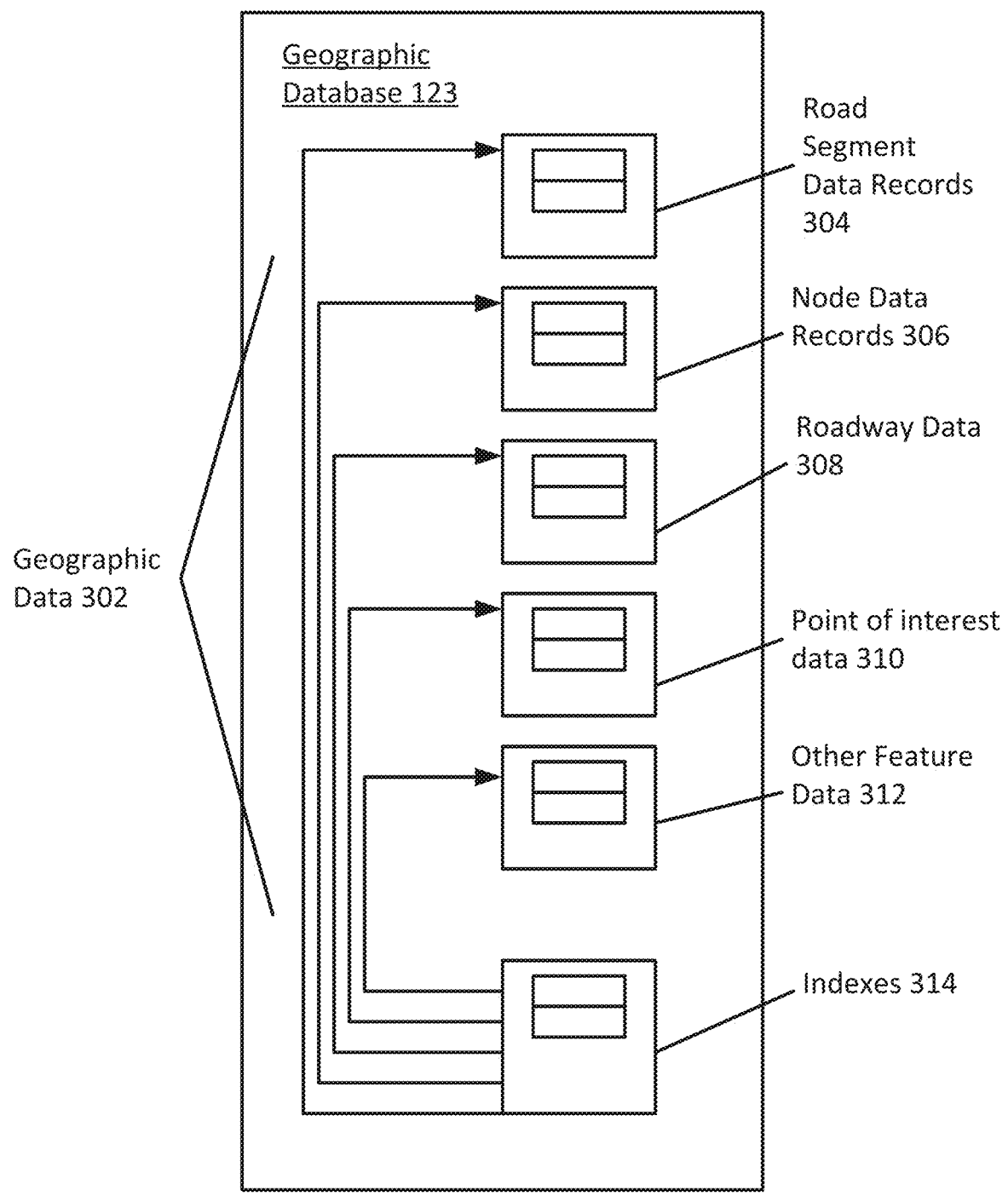
FIG. 7 depicts an example geographic database of FIG. 2.

As depicted in FIG. 7, in one embodiment, the geographic database 123 contains geographic data 302 that represents some of the geographic features in the geographic region 202 depicted in FIG. 6. The data 302 contained in the geographic database 123 may include data that represent the road network 208. In FIG. 7, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 312 may represent types of geographic features. For example, the feature data may include roadway data 308 including signage data, lane data, traffic signal data, physical and painted features like dividers, lane divider markings, road edges, center of intersection, stop bars, overpasses, overhead bridges etc. The roadway data 308 may be further stored in sub-indices that account for different types of roads or features. The point of interest data 310 may include data or sub-indices or layers for different types points of interest. The point of interest data may include point of interest records comprising a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc. The feature data 312 may include other roadway features. The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

FIG. 7 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with the data record, information such as "attributes", "fields", etc. that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include data 304(4) indicating whether the represented road segment is part of a controlled access road (such as an expressway), a ramp to a controlled access road, a bridge, a tunnel, a toll road, a ferry, and so on. The road segment data record 304 may include data 304(5) related to points of interest. The road segment data record 304 may include data 304(6) that describes roadway data. The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. The road segment data record 304 may also include or be associated with other data 304(7) that refer to various other attributes of the represented road segment such as coordinate data for shape points, POIs, signage, other parts of the road segment, among others. The various attributes associated with a road segment may be included in a single road segment record or may be included in more than one type of record which cross-references to each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

Figure 8:
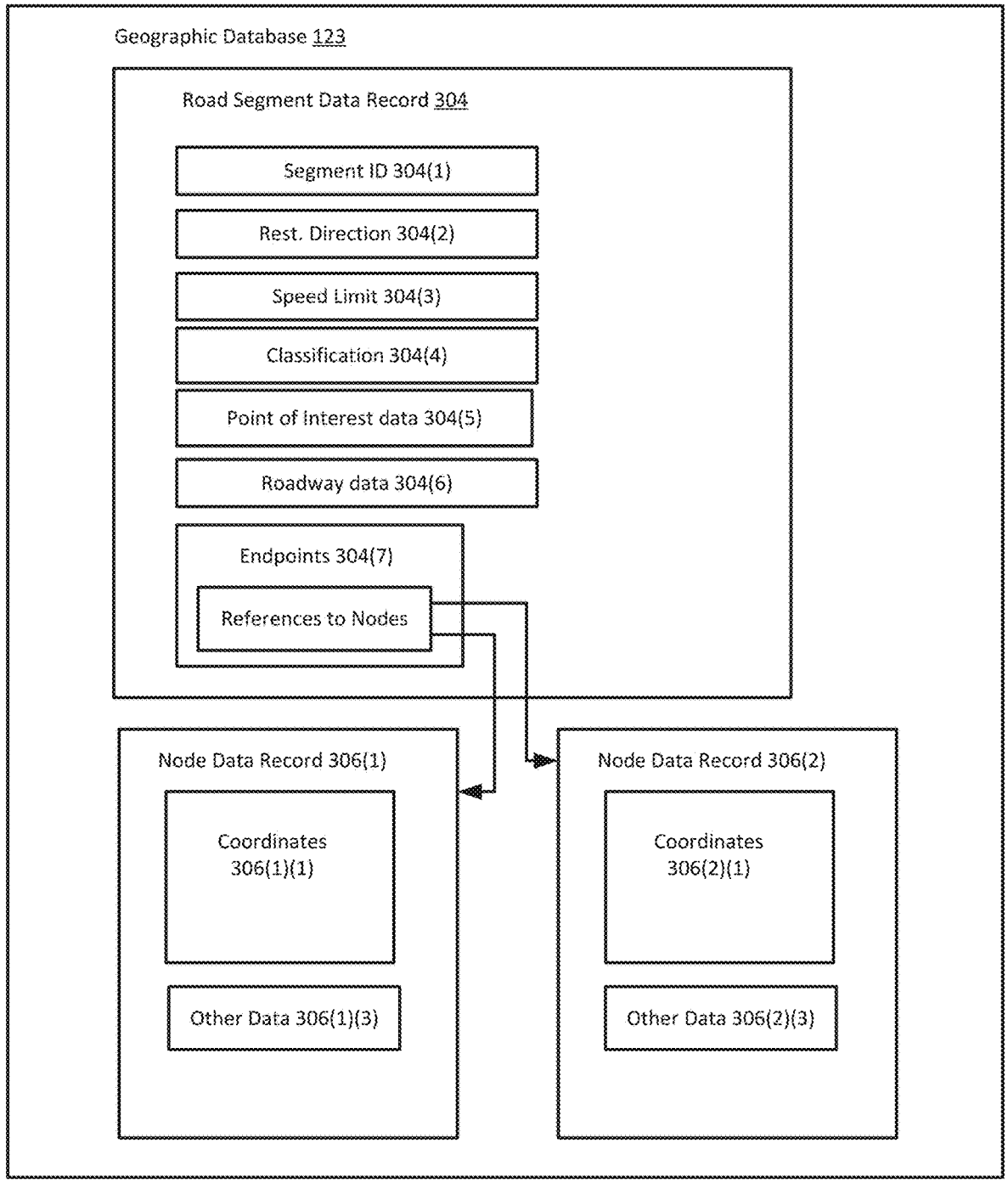
FIG. 8 depicts an example structure of the geographic database.

FIG. 8 also shows some of the components of a node data record 306 which may be contained in the geographic database 123. Each of the node data records 306 may have associated information (such as "attributes", "fields", etc.) that allows identification of the road segment(s) that connect to it and/or a geographic position (e.g., latitude and longitude coordinates). For the embodiment shown in FIG. 8, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes.

The data in in the geographic database 123 may also be organized using a graph that specifies relationships between entities. A Location Graph is a graph that includes relationships between location objects in a variety of ways. Objects and their relationships may be described using a set of labels. Objects may be referred to as "nodes" of the Location Graph, where the nodes and relationships among nodes may have data attributes. The organization of the Location Graph may be defined by a data scheme that defines the structure of the data. The organization of the nodes and relationships may be stored in an Ontology that defines a set of concepts where the focus is on the meaning and shared understanding. The descriptions permit mapping of concepts from one domain to another. The Ontology is modeled in a formal knowledge representation language that supports inferencing and is readily available from both open-source and proprietary tools.

Additional information may be added to the Location Graph by users to further enhance the detail and information level provided by the natural guidance. For example, a pedestrian may visit a building for the first time and then subsequently a second location based on the relationship between the building and the second location. The locational data may be added to the location map bound to an existing location node if that location node corresponds to the location. In this manner, for a subsequent user, a path or destination may be predicted to the second location. The Location Graph may include relationships of various kinds between nodes of the location maps and may use different relationships based on a context of the user. Thus, the Location Graph is a series of interconnected nodes that are traversed according to the context of a user. The Location Graph and data therein may be used to predict paths or destinations for users based on the relationships stored therein.

Referring back to FIG. 5, each path or destination of the candidate 135 is determined based in part on location context derived from information stored in the geographic database 123 about each destination and location. If, for example, the destinations 411 and 413 are restaurants that primarily serve lunch and it is past the lunch hour then the candidate 135 may be less likely to end up at these destinations 411 and 413. Similarly, if there are no places of business or points of interest further in the direction of 423 then it is less likely that the candidate 135 would end up in that direction. All this information may be used to predict where the pedestrian goes while taking into account the motion analysis. As an example, if the candidate 135 crosses the street, under the circumstances described above the most likely destinations are the shared vehicle 124, the POIs 415, and 425. The POIs 411 and 413 are not likely as they are lunch places and it is past lunch hour. The destination 421 is not likely as the candidate 135 is moving away from that direction. 423 is not likely because there are few to no businesses or possible destinations in that direction.

Referring back to FIG. 3, at Act A130, the shared vehicle 124 calculates, for example in real time, an interest index value for each candidate 135 based at least the respective paths and/or possible destinations for each candidate 135. The interest index value is indicative of the chance or probability that each candidate 135 becomes an actual passenger. One primary component in the calculation is the predicted trajectories/paths/destinations of each of the candidates 135 that is determined above. If a candidate 135 is not predicted to pass by or end at the shared vehicle 124, the interest index value may be very low. Likewise, if the candidate user is expected to pass by or end up at the shared vehicle 124, the interest index value may be high. The interest index value may be calculated using multiple different parameters other than the trajectories including, but not limited to: the person's context (alone, in group, carrying something, etc.), proximity of the vehicle, eye contact with the vehicle, facial expression detection, possible reaction when the vehicle communicates with the candidate 135, the presence of other "bookable" vehicles in the direct vicinity, environmental attributes, etc. These inputs, when available, may be used to compute the interest index in order to quantify the likelihood that a given individual is interested in boarding a specific vehicle. A candidate 135 attempting to hail the shared vehicle 124 by waving his or her arms may receive a very high interest index value. However, such an action may be not be indicative of the candidate user attempting to hail this particular shared vehicle 124 and thus may result in false positives. If, however, the candidate 135 is both waving his or her arm and moving towards the shared vehicle 124, the interest index value may be very high.

Figure 9:
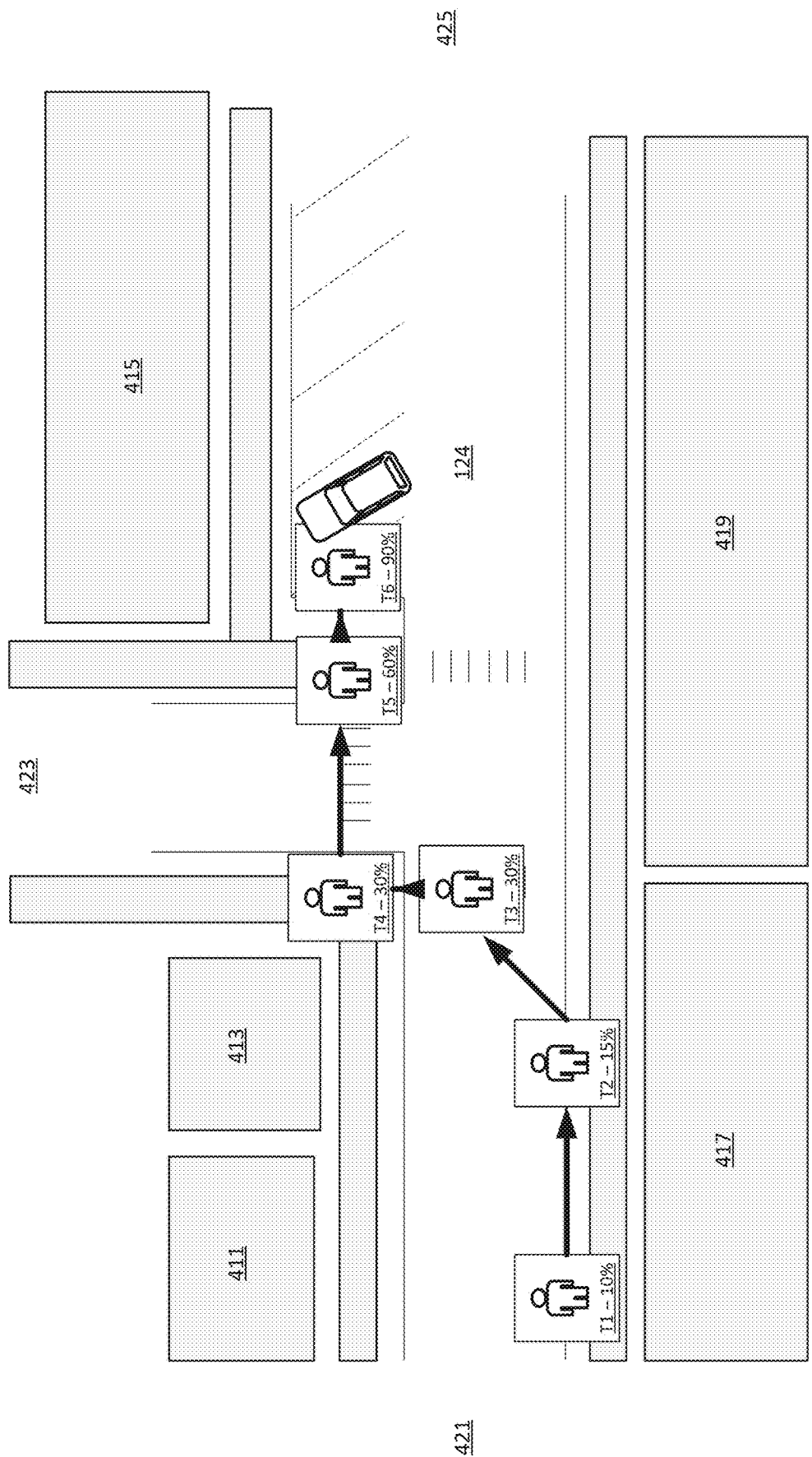
FIG. 9 depicts an example of an interest index value over time for a candidate pedestrian according to an embodiment.
Figure 10:
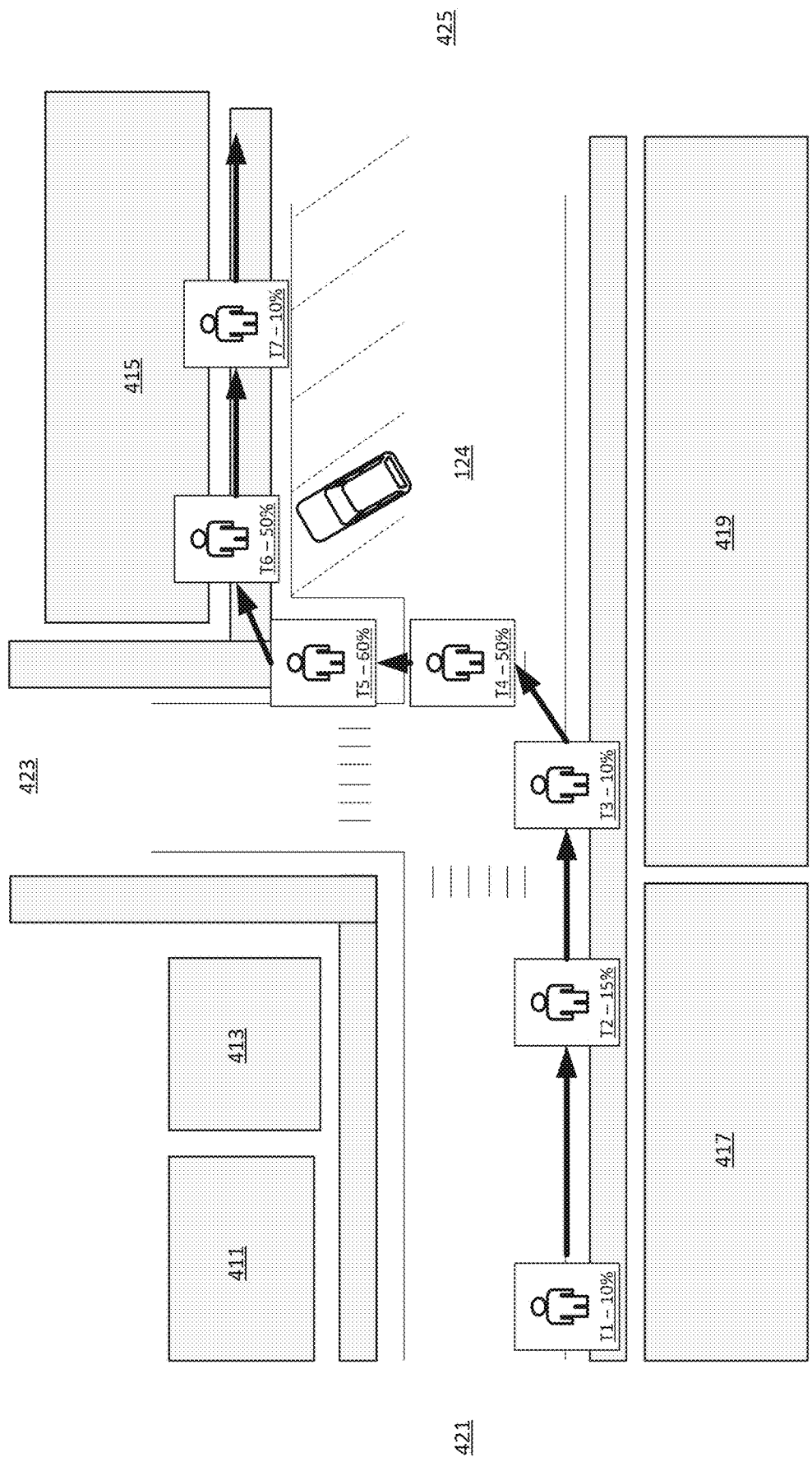
FIG. 10 depicts an example of an interest index value over time for a candidate pedestrian according to an embodiment.

FIGS. 9 and 10 depict interest values for a candidate 135 in the example described above over time in two different scenarios. In FIG. 9, the candidate 135 is attempting to reserve and hail the shared vehicle 124. In FIG. 10, the candidate 135 is not attempting to reserve the shared vehicle 124. FIG. 9 depicts six (6) different time periods T1-T6 of the candidate 135 as they make their way to the shared vehicle 124. The interest index values are listed below each location, for example, at T1 the interest index value is 10%. At T4, the interest index value is 30%. As can be seen, the interest index value increases over time as the candidate 135 approaches the shared vehicle 124 indicating that the candidate 135 is more and more likely going to use the shared vehicle 124. The two biggest jumps in the values are when the candidate 135 crosses the roads to make their way to the shared vehicle 124. AT T5 and T6, the shared vehicle 124 may acknowledge the candidate's interest by generating and transmitting a visual or audio signal. Similarly, at both these points, the shared vehicle 124, depending on predetermined or dynamic thresholds, may provide some or all access to certain features. For example, at T6, with the interest index value at 90%, the shared vehicle 124 may unlock all of the doors for the candidate.

FIG. 10 depicts a similar candidate 135 as FIG. 9. However, this candidate 135 does not end up using the shard vehicle. The interest index value can be seen increasing over time (T1-T7) as the candidate 135 makes their way towards and past the shared vehicle 124. At T1 the interest index value is 10%, at T4 when the candidate 135 crosses the street, the interest index value is 50%. However, the candidate 135 does not wish to use the shared vehicle 124 and passes by the shared vehicle 124 at T6 which leads to the drop in the interest index value to 10% at T7.

In an embodiment, each of these examples, snapshots, and values may be used as feedback to improve the predictive capabilities of the shared vehicle 124 and to improve the calculation of the interest index value. In an embodiment, the interest index may be calculated using a trained neural network. The neural network/machine learning techniques may each be or include a trainable algorithm, an, for example deep, i.e., multilayer, artificial neural network, a Support Vector Machine (SVM), a decision tree and/or the like. The machine-learning facilities may be based on k-means clustering, Temporal Difference (TD) learning, for example Q learning, a genetic algorithm and/or association rules or an association analysis. The machine-learning facilities may for example be or include a (deep) convolutional neural network (CNN), a (deep) adversarial neural network, a (deep) generative adversarial neural network (GAN), or other type of network. The neural network may be defined as a plurality of sequential feature units or layers. Sequential is used to indicate the general flow of output feature values from one layer to input to a next layer. The information from the next layer is fed to a next layer, and so on until the final output. The layers may only feed forward or may be bi-directional, including some feedback to a previous layer. The nodes of each layer or unit may connect with all or only a sub-set of nodes of a previous and/or subsequent layer or unit. Skip connections may be used, such as a layer outputting to the sequentially next layer as well as other layers. Rather than pre-programming the features and trying to relate the features to attributes, the deep architecture is defined to learn the features at different levels of abstraction based on the input data. The features are learned to reconstruct lower-level features (i.e., features at a more abstract or compressed level). Each node of the unit represents a feature. Different units are provided for learning different features. Various units or layers may be used, such as convolutional, pooling (e.g., max pooling), deconvolutional, fully connected, or other types of layers. Within a unit or layer, any number of nodes is provided. For example, 100 nodes are provided. Later or subsequent units may have more, fewer, or the same number of nodes. Training data may be collected at different types of locations, setups, or scenarios. In an embodiment, different networks may be used for different locations, setups, or scenarios. Alternatively, a singular network may be trained using a large swath of training data and thus may be configured to handle each scenario. Collection of the training data and feedback may include acquiring image data, trajectory data, and result data over a period of time for various candidates 135.

At Act A140, the shared vehicle 124 acknowledges an interest of a candidate 135 based on a respective interest index value passing a threshold value. In an embodiment, a signal is generated that lets the candidate 135 know that the shared vehicle 124 is monitoring them. The signal may change over time as the interest index value increases, for example, increasing an intensity of a light or sound. A different or unique signal may be used when the interest index value passes the threshold value. There may be multiple different threshold values or reflection points on the interest index scale. As an example, when a "certainty threshold" is crossed (e.g., >80%, >60%, >50%), the shared vehicle 124 might unlock or, if that is not the case (between 50%, and 80%), the shared vehicle 124 may decide to wait and keep monitoring the user until it is able to decide whether the particular user 135 will want to use that vehicle or not. In an embodiment, the shared vehicle 124 may only be sure of the user's intent when the user physically touches the car to open the door/trunk.

In an embodiment, if multiple candidates 135 are walking towards a given shared vehicle 124, the shared vehicle 124 may identify the group as a cohort of people and analyze their behaviors as a group. The shared vehicle 124 may determine the interest index for each individual as well as for the group, based on the detected signs and behavioral patterns. One factor may be whether there is enough space in the vehicle to accommodate all the detected candidates 135. If there is not enough space, the shared vehicle 124 may proactively suggest another nearby vehicle or even make a request for it, based on its confidence level or if confirmed by one of the passengers.

At Act A150, the shared vehicle 124 performs an action relating to access to the one or more features in the shared vehicle 124 for the candidate 135. Upon determining that the candidate 135 is a likely user (e.g., with an interest index value above the threshold), if moving, the shared vehicle 124 may initiate a pickup maneuver that is intended to position the shared vehicle 124 to allow the pedestrian to board. By way of example, the pickup maneuver can include deceleration of the shared vehicle 124 such that the shared vehicle 124 stops in proximity to the pedestrian, a lane-change maneuver to ensure that there are no lanes of traffic between a stopped position of the shared vehicle 124 and the candidate 135, or substantially any other maneuver that facilitates a candidate 135 boarding the shared vehicle 124. In an embodiment, the shared vehicle may perform a U-turn or find a safe spot to pick up a candidate 135.

If parked or once stationary, the shared vehicle 124 may provide access to one or more features. The one or more features may include automatic doors, automatic tailgate or trunk, automatic windows, automatic head lights, heated seats, automatic climate systems, entertainment systems, etc. The one or more features may be turned on, off, or adjusted for a particular candidate 135 based on detected conditions in the area.

In an embodiment, using all the map related information, as well as the sensor information and any additional input, the shared vehicle 124 is able to be "spatially aware" of its environment. Based on this "spatial awareness", a shared vehicle 124 may decide to stay at a specific location, to move to a new one, for example a possibly more advantageous location at a given time of the day, depending on an optimization function of the vehicle. The spatial awareness may be based on dynamic information like nearby events, the number of people around, etc. The shared vehicle 124 may move if there are too few candidates 135 or if there are too many false positives. The shared vehicle 124 may also remain in an area to collect data to improve the predictive ability, for example, by monitoring candidates 135 over time to better predict trajectories or destinations. The shared vehicle 124 may provide this information to the mapping system 121 or other shared vehicles 124.

Figure 11:
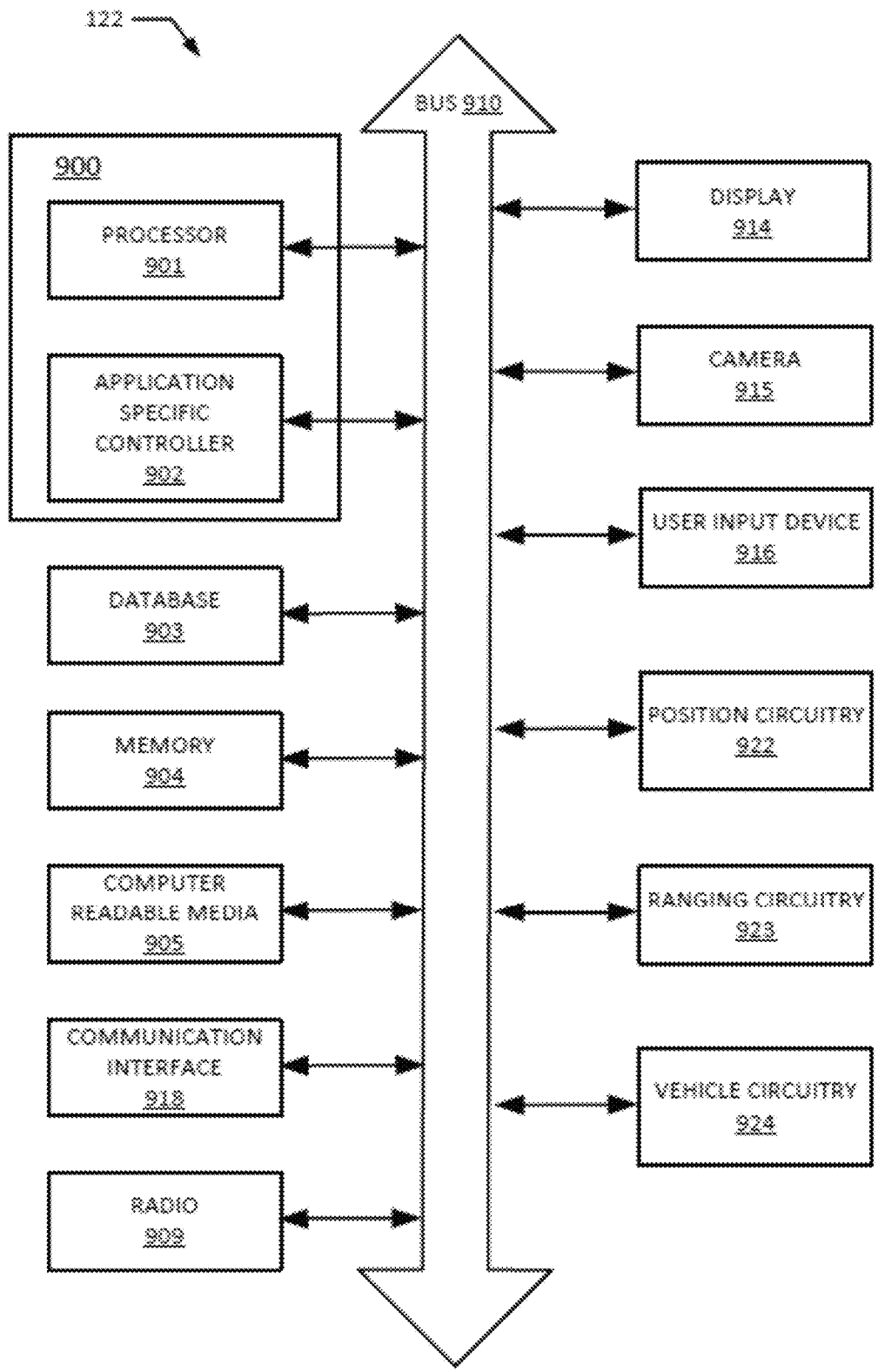
FIG. 11 depicts an example device of FIG. 2.

FIG. 11 illustrates an example mobile device 122 for the system of FIG. 2 embedded in or included with a shared vehicle 124 that is configured to calculate an interest index value for a candidate 135 in the shared vehicle 124. The mobile device 122 may include a bus 910 that facilitates communication between a controller 900 that may be implemented by a processor 901 and/or an application specific controller 902, which may be referred to individually or collectively as controller 900, and one or more other components including a database 903, a memory 904, a computer readable medium 905, a communication interface 918, a radio 909, a display 914, a camera 915, a user input device 916, position circuitry 922, ranging circuitry 923, and vehicle circuitry 924. The contents of the database 903 are described with respect to the geographic database 123. The device-side database 903 may be a user database that receives data in portions from the database 903 of the mobile device 122. The communication interface 918 connected to the internet and/or other networks (e.g., network 127 shown in FIG. 2). Additional, different, or fewer components may be included.

The controller 900 may communicate with a vehicle engine control unit (ECU) that operates one or more driving mechanisms (e.g., accelerator, brakes, steering device). The controller 900 may communicate with one or more features that may be turned on, off, or adjusted based on a calculated interest index value for a candidate 135, including, for example, automatic door locking mechanisms, automatic windows, automatic trunk/tailgate, automatic entertainment system, automatic headlights, or others. The mobile device 122 may be the vehicle ECU, that operates the one or more driving mechanisms directly. The controller 900 may include a routing module including an application specific module or processor that calculates routing between an origin and destination. The routing module is an example means for generating a route. The routing command may be a driving instruction (e.g., turn left, go straight), that may be presented to a driver or passenger, or sent to an assisted driving system. The display 914 is an example means for displaying the routing command. The mobile device 122 may generate a routing instruction based on the anonymized data.

The routing instructions may be provided by the display 914. The mobile device 122 may be configured to execute routing algorithms to determine an optimum route to travel along a road network from an origin location to a destination location in a geographic region. Using input(s) including map matching values from the mapping system 121, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments. The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The radio 909 may be configured to radio frequency communication (e.g., generate, transit, and receive radio signals) for any of the wireless networks described herein including cellular networks, the family of protocols known as WIFI or IEEE 802.11, the family of protocols known as Bluetooth, or another protocol.

The memory 904 may be a volatile memory or a non-volatile memory. The memory 904 may include one or more of a read only memory (ROM), random access memory (RAM), a flash memory, an electronic erasable program read only memory (EEPROM), or other type of memory. The memory 904 may be removable from the mobile device 122, such as a secure digital (SD) memory card.

The communication interface 918 may include any operable connection. An operable connection may be one in which signals, physical communications, and/or logical communications may be sent and/or received. An operable connection may include a physical interface, an electrical interface, and/or a data interface. The communication interface 818 and/or communication interface 918 provides for wireless and/or wired communications in any now known or later developed format.

The input device 916 may be one or more buttons, keypad, keyboard, mouse, stylus pen, trackball, rocker switch, touch pad, voice recognition circuit, or other device or component for inputting data to the mobile device 122. The input device 916 and display 914 be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

The positioning circuitry 922 may include suitable sensing devices that measure the traveling distance, speed, direction, and so on, of the mobile device 122. The positioning system may also include a receiver and correlation chip to obtain a GPS signal. Alternatively, or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122. The position circuitry 922 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The ranging circuitry 923 may include a LiDAR system, a RADAR system, a structured light camera system, SONAR, or any device configured to detect the range or distance to objects from the mobile device 122. Radar sends out radio waves that detect objects and gauge their distance and speed in relation to the vehicle in real time. Both short- and long-range radar sensors may be deployed all around the car and each one has their different functions. While short range (24 GHz) radar applications enable blind spot monitoring, for example lane-keeping assistance, and parking aids, the roles of the long range (77 GHz) radar sensors include automatic distance control and brake assistance. Unlike camera sensors, radar systems typically have no trouble when identifying objects during fog or rain. LiDAR (Light Detection and Ranging) sensors work similar to radar systems, with the difference being that LiDAR uses lasers instead of radio waves. Apart from measuring the distances to various objects on the road, the shared vehicle 124 may use lidar to create 3D images of the detected objects and mapping the surroundings. The shared vehicle 124 may use LiDAR to create a full 360-degree map around the vehicle rather than relying on a narrow field of view.

The ranging circuitry may also include cameras at every angle and may be capable of maintaining a 360° view of its external environment. The shared vehicle 124 may utilize 3D cameras for displaying highly detailed and realistic images. These image sensors automatically detect objects, classify them, and determine the distances between them and the vehicle. For example, the cameras can easily identify other cars, pedestrians, cyclists, traffic signs and signals, road markings, bridges, and guardrails. By identifying potential users over time, the shared vehicle 124 may be able to track and predict movements by each potential user. The shared vehicle 124 may use multiple different sensors to monitor potential users. Different sensors may be used at different times of the day (because of lighting) or in different locations or during weather events. In additional to on-board sensors, the shared vehicle 124 may also acquire data from other devices or sensors in the area, for example, security cameras or other imaging sensors.

In an embodiment, the ranging circuitry and cameras are configured to monitor and track candidates 135 that may wish to use the shared vehicle 124. The device 122 is configured to predict the paths and/or destinations of the candidates 135 based off of mapping data from the geographic database 123 and detected motion that is derived from the monitoring of the candidates 135. The device 122 is configured to calculate an interest index value for each candidate 135 that is related to the likelihood that a respective candidate 135 will use the shared vehicle 124. The device 122 is configured to provide access to one or more features of the shared vehicle 124 when the interest index value passes one or more thresholds. The device 122 may include an input device 916 and an output device 914 that are configured to provide an acknowledgment to a respective candidate 135 when the interest index value achieves a level or threshold. The acknowledgment may be visual or audio based.

Figure 12:
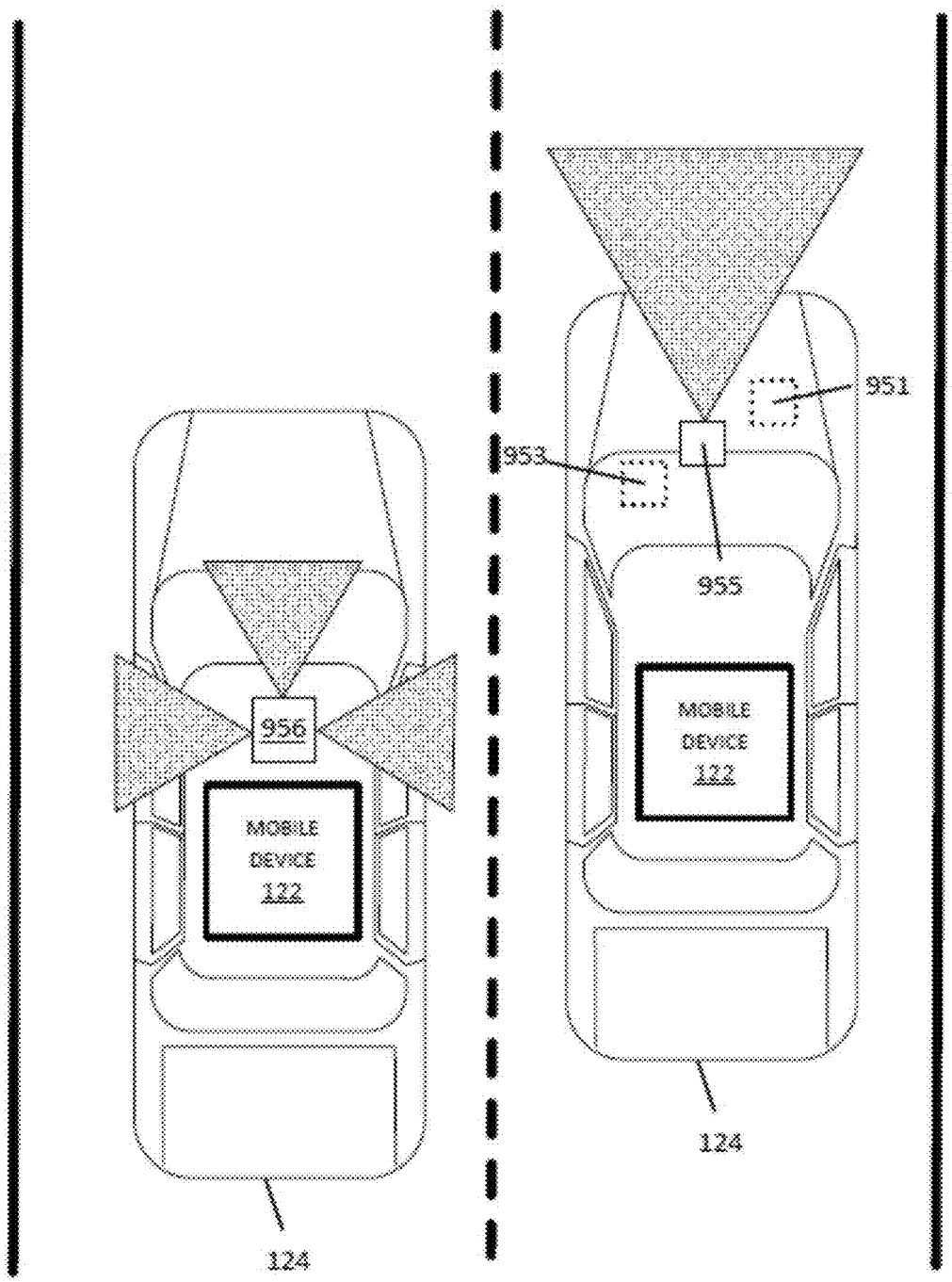
FIG. 12 depicts an example autonomous vehicle according to an embodiment.

FIG. 12 illustrates exemplary vehicles 124 for providing location-based services or application using the systems and methods described herein as well as collecting data for such services or applications described herein. The vehicles 124 may include a variety of devices that collect position data as well as other related sensor data for the surroundings of the vehicle 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively, or additionally, the one or more detectors or sensors may include an accelerometer built or embedded into or within the interior of the vehicle 124. The vehicle 124 may include one or more distance data detection device or sensor, such as a LiDAR device. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the vehicle 124 to the mapping system 121. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and the mapping system 121. The network may be the Internet or connected to the internet.

The sensor array may include one or more sensors configured to detect surroundings of the vehicle 124. The sensor array may include multiple sensors. Example sensors include an optical distance system such as LiDAR 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the lane marking indicators (lane marking type, lane marking intensity, lane marking color, lane marking offset, lane marking width, or other characteristics) received from geographic database 123 and the mapping system 121 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) received from geographic database 123 and the mapping system 121 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to lane marking indicators (lane marking type, lane marking intensity, lane marking color, lane marking offset, lane marking width, or other characteristics) received from geographic database 123 and the mapping system 121 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) received from geographic database 123 and the mapping system 121 and driving commands or navigation commands.

The term "computer-readable medium" includes a single medium or multiple medium, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A method for providing access to one or more features in a shared vehicle, the method comprising:
    monitoring, by a processor in the shared vehicle, an area around the shared vehicle, wherein the shared vehicle is parked in a parking spot and waiting for an individual to reserve the shared vehicle;
    predicting, by the processor, trajectories for each pedestrian candidate in the area around the shared vehicle that is approaching the shared vehicle as a function of a locational context derived from a geographic database containing information on the area around the shared vehicle;
    calculating, by the processor in real time, an interest index value for each pedestrian candidate based on at least one trajectory for each pedestrian candidate, wherein the interest index value is indicative of a probability that each pedestrian candidate becomes an actual passenger of the shared vehicle that is parked in the parking spot and waiting for the individual to reserve the shared vehicle;
    acknowledging, by the processor, an interest of a respective pedestrian candidate based on a respective interest index value passing a threshold value; and
    reserving the shared vehicle when the interest index value passes the threshold value and unlocking the shared vehicle when the interest index value passes a secondary threshold that is higher than the threshold value as a function of tactile feedback at the vehicle from the respective pedestrian candidate.

2. The method of claim 1, further comprising:
    generating and transmitting, by the processor, an audio or visual signal to the pedestrian candidate when the respective interest index value passes the threshold value.

3. The method of claim 1, wherein the interest index value is further calculated based on one or more parameters including at least one of a proximity of the shared vehicle, eye contact with the shared vehicle, facial expression detection, a presence of other bookable shared vehicles in the area, environmental attributes, or weather events.

4. The method of claim 1, wherein predicting trajectories comprises:
identifying, by the processor, the locational context for the area around the shared vehicle based on one or more points of interest in the area;
determining, by the processor, possible destinations for the respective pedestrian candidate based on the one or more points of interests and the locational context; and
assigning, by the processor, a probability to each respective possible destination for the respective pedestrian candidate;
wherein the probability is used to calculate the interest index value.

5. The method of claim 4, wherein the possible destinations for the respective pedestrian candidate are further based on historical data relating to pedestrian traffic for the one or more points of interest.

6. The method of claim 4, wherein the possible destinations are determined based further on at least a time of day, current weather conditions, or one or more events.

7. The method of claim 1, wherein the interest index value for each pedestrian candidate is calculated based at least one deviation in a respective trajectory for each pedestrian candidate from a normal flow of pedestrian traffic.

8. The method of claim 1, further comprising:
generating, by the processor, a command for the shared vehicle to move a different location based on interest index values for pedestrian candidates in the area.

9. An apparatus comprising:
at least one processor; and
at least one memory including computer program code for one or more programs; the at least one memory configured to store the computer program code configured to, with the at least one processor, cause the at least one processor to:
monitor an area around a shared vehicle, wherein the shared vehicle is parked in a parking spot and waiting for an individual to reserve the shared vehicle;
predict trajectories for each pedestrian candidate in the area around the shared vehicle, wherein the prediction is based at least in part on a locational context derived from a geographic database containing information on the area around the shared vehicle;
calculate an interest index value for each pedestrian candidate based on at least one predicted trajectory for each pedestrian candidate, wherein the interest index value is indicative of a probability that each pedestrian candidate becomes an actual passenger of the shared vehicle that is parked in the parking spot and waiting for the individual to reserve the shared vehicle;
acknowledge an interest of a pedestrian candidate based on a respective interest index value passing a threshold value; and
reserve the shared vehicle when the interest index value passes the threshold value and unlock the shared vehicle when the interest index value passes a secondary threshold that is higher than the threshold value as a function of tactile feedback at the vehicle from the respective pedestrian candidate.

10. The apparatus of claim 9, wherein the computer program code is further configured to cause the at least one processor to generate and transmit an audio or visual signal to the pedestrian candidate when the respective interest index value passes the threshold value.

11. The apparatus of claim 9, wherein the interest index value is further calculated based on one or more parameters including at least one of a proximity of the shared vehicle, eye contact with the shared vehicle, facial expression detection, a presence of other bookable shared vehicles in the area, environmental attributes, or weather events.

12. The apparatus of claim 9, wherein the computer program code is configured to predict trajectories for each pedestrian candidate by causing the at least one processor to:
identify the locational context for the area around the shared vehicle based on one or more points of interest in the area;
determine possible destinations for the pedestrian candidate based on the one or more points of interests and the locational context; and
assign a probability to each respective possible destination for the pedestrian candidate;
wherein the probability is used to calculate the interest index value.

13. The apparatus of claim 12, wherein the possible destinations for the pedestrian candidate are further based on historical data relating to pedestrian traffic for the one or more points of interest.

14. The apparatus of claim 12, wherein the possible destinations are determined based further on at least a time of day, current weather conditions, or one or more events.

15. A shared autonomous vehicle comprising:
one or more sensors configured to acquire image data for one or more pedestrian candidates;
a geographic database configured to store mapping data;
a processor configured to predict destinations for the one or more pedestrian candidates based on the acquired image data and the mapping data, the processor further configured to calculate an interest index value for each of the one or more pedestrians based on the predicted destinations, wherein the predicted destinations are based at least in part on a locational context derived from a geographic database containing information on the area around the shared autonomous vehicle, wherein the interest index value is indicative of a probability that each pedestrian candidate of the one or more pedestrians becomes an actual passenger of a shared vehicle that is parked in a parking spot and waiting for an individual to reserve the shared vehicle; and
an automatic door locking mechanism of the shared vehicle configured to unlock when the interest index value reaches a threshold value and upon receipt of tactile feedback at the vehicle from the respective pedestrian candidate.

16. The shared autonomous vehicle of claim 15, wherein the processor is configured calculate the interest index value repeatedly at set intervals.

17. The shared autonomous vehicle of claim 15, wherein the shared autonomous vehicle is stationary while the one or more sensors acquire the image data for the one or more pedestrian candidates.

* * * * *